(12) United States Patent
Uemura

(10) Patent No.: US 9,348,110 B2
(45) Date of Patent: May 24, 2016

(54) LENS BARREL AND IMAGING APPARATUS

(71) Applicant: CANON KABUSHIKI KAISHA, Tokyo (JP)

(72) Inventor: Kohei Uemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/340,965

(22) Filed: Jul. 25, 2014

(65) Prior Publication Data
US 2015/0043089 A1 Feb. 12, 2015

(30) Foreign Application Priority Data

Aug. 8, 2013 (JP) ................................. 2013-164756

(51) Int. Cl.

| | | |
|---|---|---|
| *G02B 15/14* | (2006.01) | |
| *G02B 7/10* | (2006.01) | |
| *G02B 7/02* | (2006.01) | |
| *G02B 7/04* | (2006.01) | |
| *G02B 13/00* | (2006.01) | |

(Continued)

(52) U.S. Cl.
CPC ................ *G02B 7/102* (2013.01); *G02B 7/022* (2013.01); *G02B 7/04* (2013.01); *G02B 7/10* (2013.01); *G02B 13/009* (2013.01); *G02B 15/14* (2013.01); *G03B 3/10* (2013.01); *G03B 17/12* (2013.01); *G03B 2205/0046* (2013.01)

(58) Field of Classification Search
CPC ........ G02B 7/022; G02B 7/026; G02B 7/021; G02B 7/023; G02B 7/04; G02B 7/08; G02B 7/10; G02B 7/102; G02B 13/003; G02B 13/0035; G02B 13/009; G02B 15/15; G02B 17/00; G03B 3/10; G03B 17/12; G03B 2205/0046
USPC ........... 359/694–704, 676; 396/72–75, 84, 85
See application file for complete search history.

(56) References Cited

U.S. PATENT DOCUMENTS

| | | | |
|---|---|---|---|
| 6,963,455 B2 * | 11/2005 | Nomura .................... | G02B 7/10 359/694 |
| 7,330,648 B2 * | 2/2008 | Morinaga .............. | G02B 7/026 348/240.3 |

(Continued)

FOREIGN PATENT DOCUMENTS

| | | |
|---|---|---|
| CN | 102053334 A | 5/2011 |
| CN | 102207602 A | 10/2011 |

(Continued)

OTHER PUBLICATIONS

Feb. 14, 2016 Chinese Official Action in Chinese Patent Appln. No. 201410389403.X.

*Primary Examiner* — Loha Ben
(74) *Attorney, Agent, or Firm* — Fitzpatrick, Cella, Harper & Scinto

(57) ABSTRACT

A lens barrel is provided that includes a lens holding unit configured to hold a lens; and a cam cylinder that is provided with a cam groove for engaging with the lens holding unit on the inner circumference thereof and of which rotation causes the lens holding unit to move in an optical axis direction. A projection is provided at the end of the cam cylinder on an imaging side, a first gear for transmitting the power for rotating the cam cylinder is provided on the outer circumferential surface of the projection, and the cam groove is provided on the inner circumferential surface of the projection.

6 Claims, 19 Drawing Sheets

(51) Int. Cl.
*G03B 3/10* (2006.01)
*G03B 17/12* (2006.01)

(56) References Cited

U.S. PATENT DOCUMENTS

| | | | |
|---|---|---|---|
| 7,751,126 B2 * | 7/2010 | Shirakata | G03B 3/10 359/699 |
| 7,965,933 B2 * | 6/2011 | Nomura | G02B 7/102 359/813 |
| 8,355,212 B2 * | 1/2013 | Matsumoto | G02B 7/102 359/699 |
| 8,483,555 B2 * | 7/2013 | Iwasaki | G03B 3/10 359/699 |
| 8,508,857 B2 | 8/2013 | Kudoh | |
| 8,654,453 B2 | 2/2014 | Katano | |
| 8,885,267 B2 | 11/2014 | Kudoh | |
| 2010/0033844 A1 | 2/2010 | Katano | |
| 2011/0096203 A1 | 4/2011 | Kudoh | |
| 2011/0242680 A1 | 10/2011 | Kudoh | |

FOREIGN PATENT DOCUMENTS

| | | |
|---|---|---|
| JP | 2006-065138 A | 3/2006 |
| JP | 2010-039285 A | 2/2010 |

* cited by examiner

LENS BARREL AND IMAGING APPARATUS

BACKGROUND OF THE INVENTION

1. Field of the Invention

The present invention relates to a lens barrel and an imaging apparatus.

2. Description of the Related Art

There has been proposed a lens barrel including a zoom mechanism that moves a plurality of lenses to a predetermined position by causing a linear cylinder to restrict the movement of a plurality of lens holding frames in the rotational direction while moving the plurality of lens holding frames for holding the plurality of lenses, respectively, in the optical axis direction by the rotation of a cam cylinder.

In order to meet the recent requirement for increasing an image-taking magnification, the number of lenses increases and a total extended length increases, resulting in a tendency with an increase in size of a lens barrel. On the other hand, there is also a requirement for thinning of a camera, and thus, the thickness of the camera when the lens barrel is retracted into the camera body needs to be reduced as much as possible.

In order to achieve thinning of a camera, it is contemplated that barrels of which the dimension is reduced in the optical axis direction are connected in a multi-stage configuration. However, there are many restrictions for disposing a plurality of cam grooves on a barrel without mutual intersection in terms of space.

Thus, Japanese Patent Laid-Open No. 2006-65138 discloses a lens barrel of which a total extended length can be increased by forming a gear disposed on the outer circumferential surface of a cam cylinder in a stepwise shape.

However, in the lens barrel disclosed in Japanese Patent Laid-Open No. 2006-65138, a total extended length can be increased only by the amount of movement of the stepwisely-moved gear. In addition, the gear needs to be disposed on the outer circumference side of the flange portion of a linear cylinder, and the length of the cam cylinder is also increased by the amount of movement of the gear, resulting in a difficulty in reduction in diameter of the barrel and thinning thereof.

SUMMARY OF THE INVENTION

The present invention provides a lens barrel which is capable of increasing its total length without increasing the thickness thereof in the retracted state.

According to an aspect of the present invention, a lens barrel is provided that includes a lens holding unit configured to hold a lens; and a cam cylinder that is provided with a cam groove for engaging with the lens holding unit on the inner circumference thereof and of which rotation causes the lens holding unit to move in an optical axis direction. A projection is provided at the end of the cam cylinder on an imaging side, a first gear for transmitting the power for rotating the cam cylinder is provided on the outer circumferential surface of the projection, and the cam groove is provided on the inner circumferential surface of the projection.

According to the present invention, a lens barrel which is capable of increasing its total length without increasing the thickness thereof in the retracted state may be provided.

Further features of the present invention will become apparent from the following description of exemplary embodiments with reference to the attached drawings.

DESCRIPTION OF THE EMBODIMENTS

Hereinafter, preferred embodiments of the present invention will be described with reference to the drawings.

Figure 1:
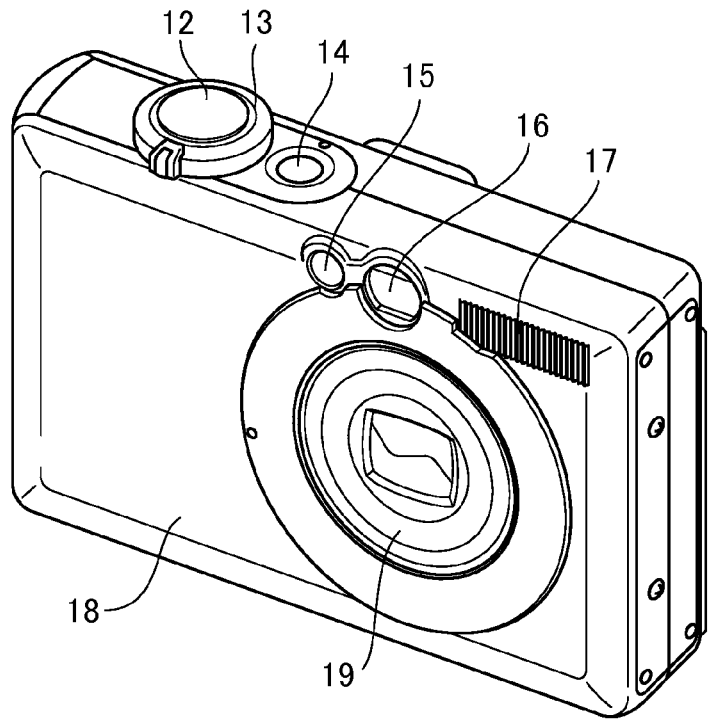
FIG. 1 is a perspective view illustrating an exemplary external appearance of an imaging apparatus as viewed from the front side.
Figure 2:
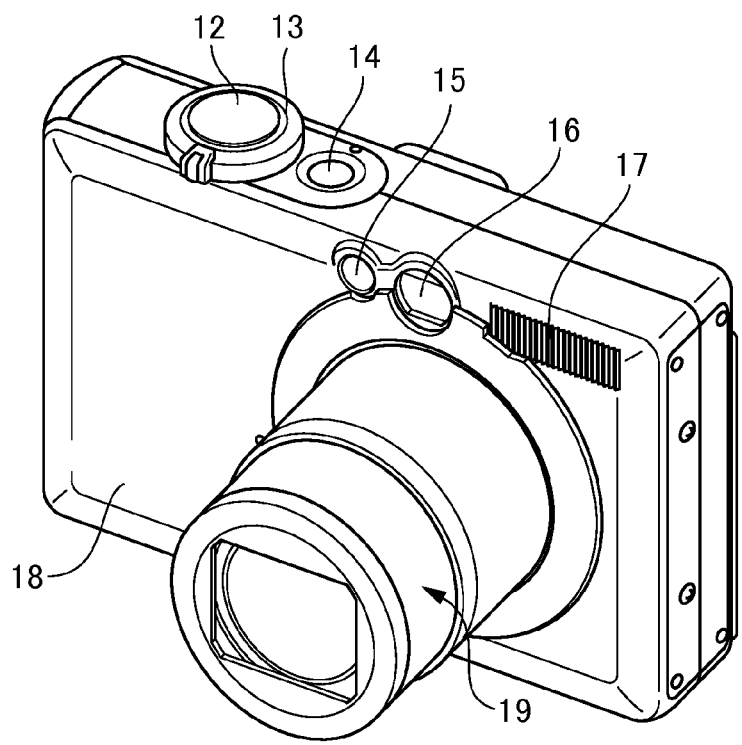
FIG. 2 is a perspective view illustrating an exemplary external appearance of a digital camera in the power-on state.
Figure 3:
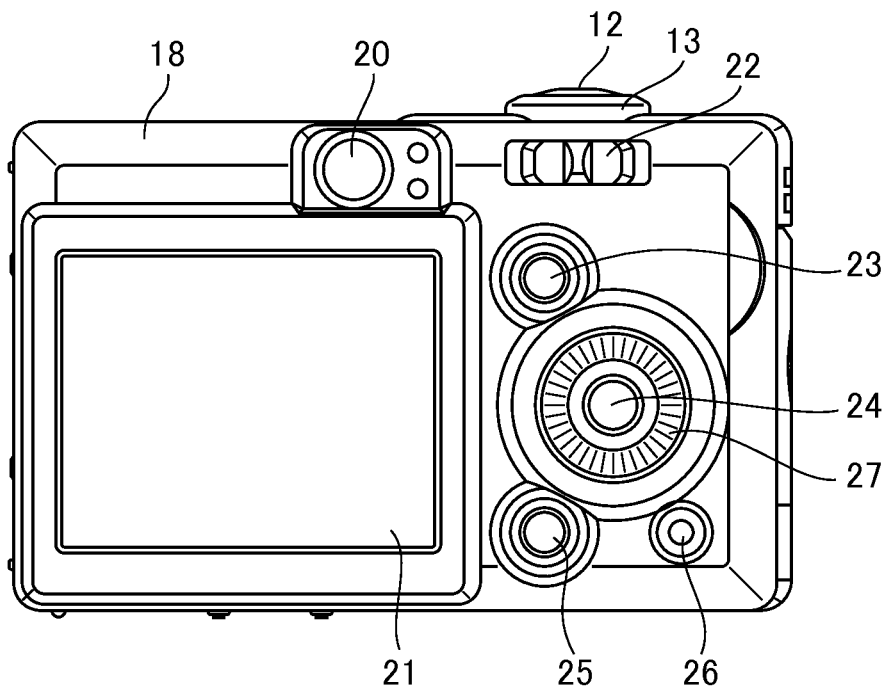
FIG. 3 is a rear view illustrating an exemplary digital camera.
Figure 4:
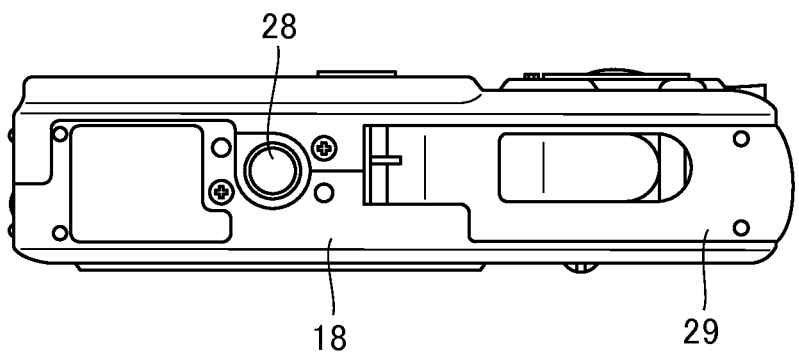
FIG. 4 is a bottom view illustrating an exemplary digital camera.

FIG. 1 is a perspective view illustrating an exemplary external appearance of an imaging apparatus including the lens barrel of the present embodiment as viewed from the front side. FIG. 2 is a perspective view illustrating an exemplary external appearance of the digital camera shown in FIG. 1 in the power-on state. FIG. 3 is a rear view illustrating the digital camera shown in FIG. 1. FIG. 4 is a bottom view illustrating the digital camera shown in FIG. 1.

A digital camera 18 according to the present embodiment includes a zoom mechanism that moves between the image-taking position and the retracted position in the optical axis direction so as to change an image-taking magnification. As shown in FIG. 1, a finder 16 for determining the composition of an object, an auxiliary light source 15 for performing light measurement and distance measurement, a strobe 17, and a lens barrel 19 are disposed on the front surface of the digital camera 18. A release button 12, a power changeover button 14, and a zoom changeover switch 13 are disposed on the top surface of the digital camera 18.

As shown in FIG. 3, operation buttons 22 to 27, a display 21 such as an LCD (Liquid Crystal Display), and a finder eyepiece 20 are disposed on the rear surface of the digital camera 18.

Furthermore, as shown in FIG. 4, a tripod mounting portion 28 and a cover 29 are disposed on the bottom surface of the digital camera 18. The cover 29 covers a memory card drive 42 (see FIG. 5) and a battery inserting portion (not shown).

Figure 5:
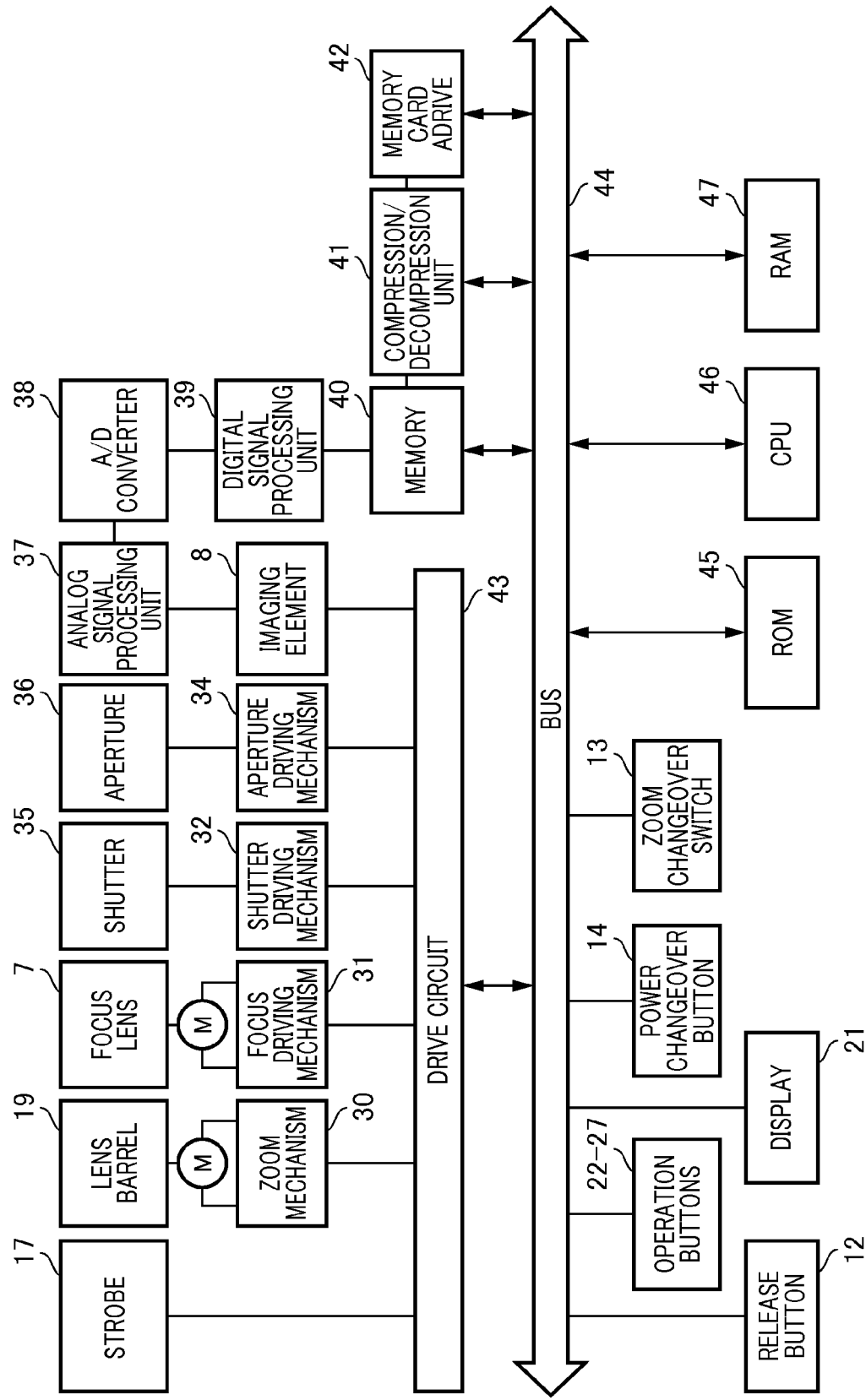
FIG. 5 is a functional block diagram illustrating an exemplary digital camera.

FIG. 5 is a functional block diagram illustrating the digital camera 18 shown in FIG. 1. A CPU 46, a ROM 45, a RAM 47, the release button 12, the operation buttons 22 to 27, the display 21, the power changeover button 14, the zoom switch 13, a memory 40, a compression/decompression unit 41, a memory card drive 42, and a drive circuit 43 are connected to a bus 44, where CPU is an abbreviation for Central Processing Unit, ROM is an abbreviation for Read Only Memory, and RAM is an abbreviation for Random Access Memory.

The drive circuit 43 is connected to a zoom mechanism (driving unit) 30 which is the power source for zoom driving of the lens barrel 19, a focus driving mechanism 31 for driving a focus lens 7, a shutter driving mechanism 32 for driving a shutter 35, and an aperture driving mechanism 34 for driving an aperture 36. The drive circuit 43 is also connected to an imaging element 8 such as a CCD sensor, a CMOS sensor, or the like and the strobe 17, where CCD is an abbreviation for Charge Coupled Device and CMOS is an abbreviation for Complementary Metal-Oxide Semiconductor. The driving of the units connected to the drive circuit 43 is controlled via the drive circuit 43 based on the signal from the CPU 46.

The ROM 45 stores various control programs and the like, and the RAM 47 stores data required for various control programs. An analog signal processing unit 37 performs analog processing for image data output from the imaging element 8, and then outputs the resulting data to an A/D converter 38.

The A/D converter 38 converts analog data captured from the imaging element 8 into digital data, and then outputs the digital data to a digital signal processing unit 39. The digital signal processing unit 39 performs predetermined processing for digital data converted by the A/D converter 38, and then outputs the resulting data as image data to the memory 40.

Image data stored in the memory 40 is subject to compression processing such as JPEG or TIFF by the compression/decompression unit 41 through the operation of the operation button 23, and then is output to and stored in a memory card mounted on the memory card drive 42.

Image data stored in the memory 40 or image data stored in the memory card is subject to decompression processing by the compression/decompression unit 41, and then can be displayed on the display 21 via the bus 44. For example, when a user sees an image displayed on the display 21 and determines the image as unnecessary, the image can be deleted by the operation of the operation button 24.

Figure 6:
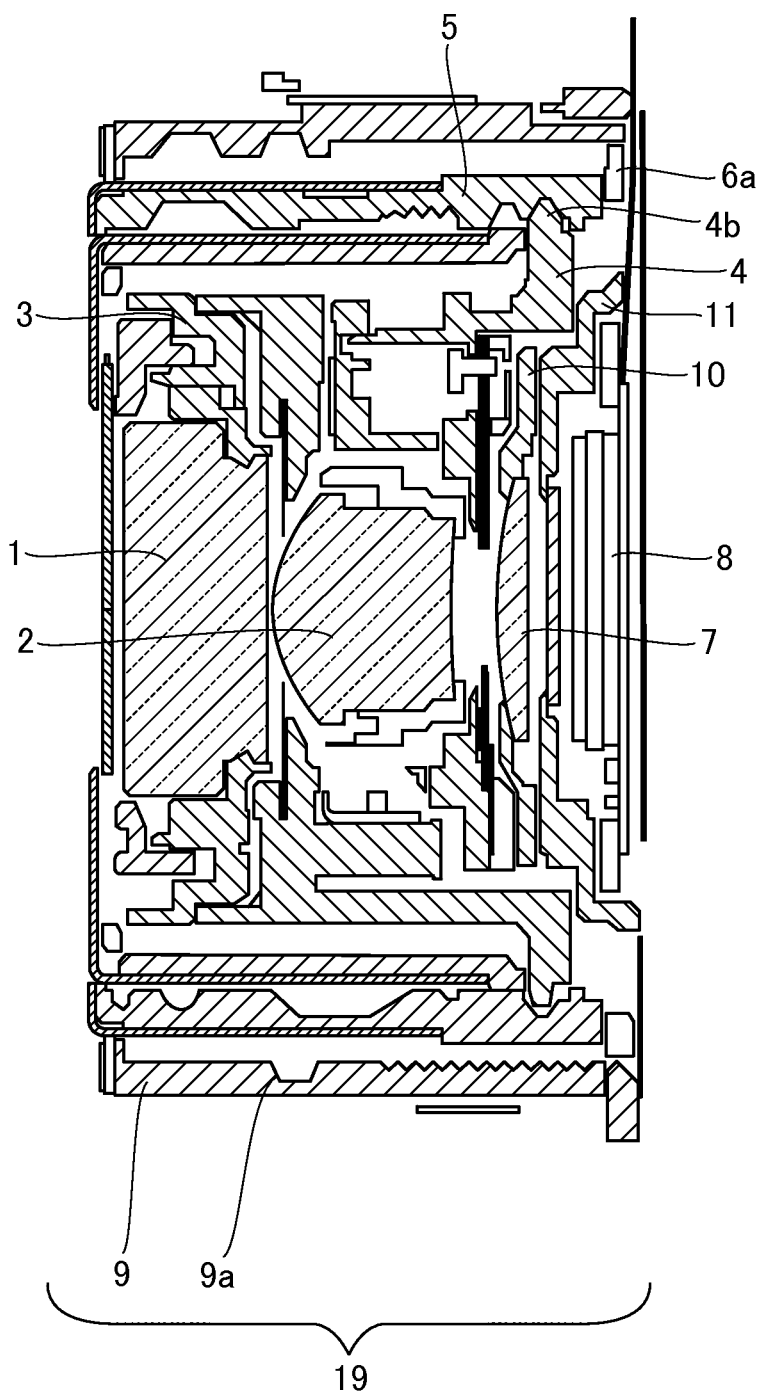
FIG. 6 is a cross-sectional view illustrating the state of a lens barrel being in the retracted position.
Figure 7:
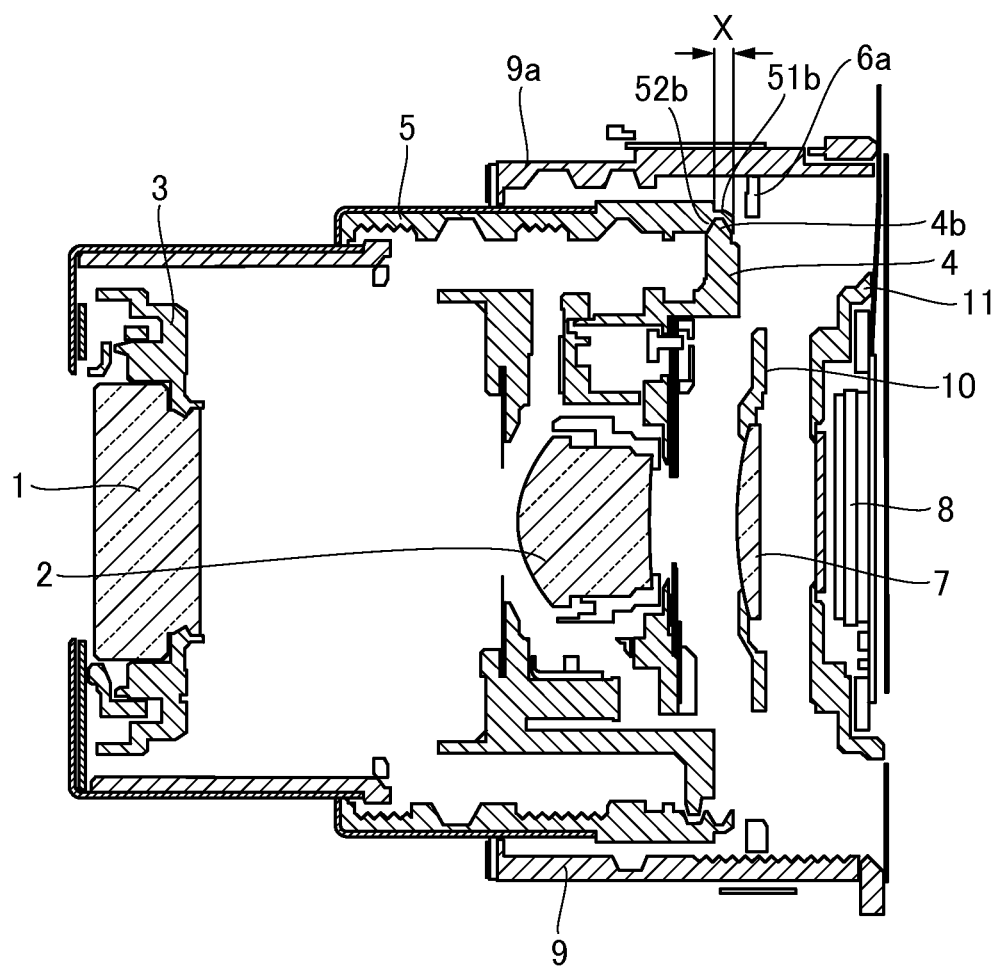
FIG. 7 is a cross-sectional view illustrating the state of a lens barrel being in the WIDE image-taking position.
Figure 8:
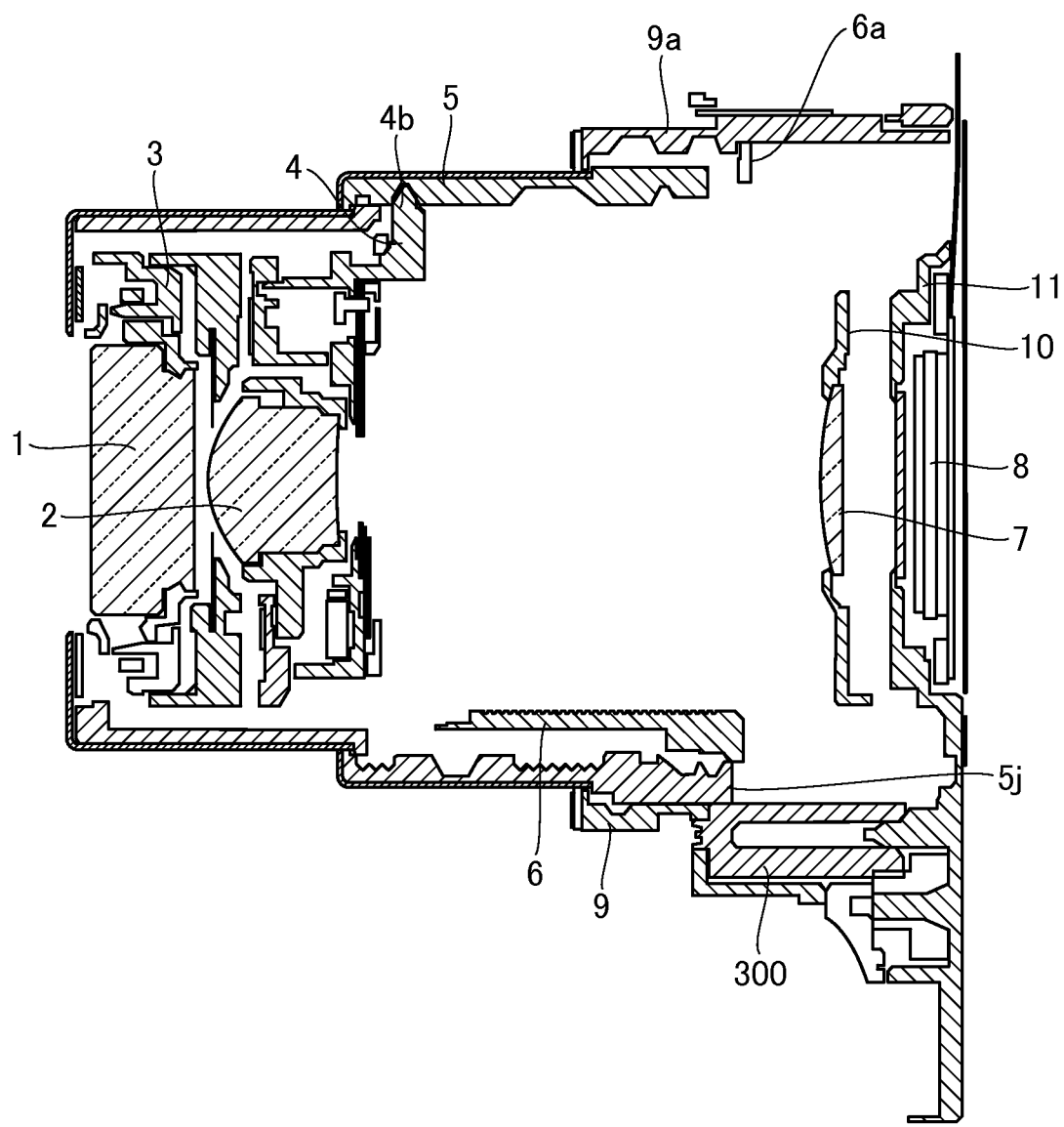
FIG. 8 is a cross-sectional view illustrating the state of a lens barrel being in the TELE image-taking position.

Next, a description will be given of the lens barrel 19 with reference to FIGS. 6 to 12. FIG. 6 is a cross-sectional view illustrating the state of the lens barrel 19 being in the retracted position. FIG. 7 is a cross-sectional view illustrating the state of the lens barrel 19 being in the WIDE image-taking position. FIG. 8 is a cross-sectional view illustrating the state of the lens barrel 19 being in the TELE image-taking position.

As shown in FIGS. 6, 7, and 8, in the lens barrel 19, a first lens 1 is held by a first lens holding frame 3 and a second lens 2 which is disposed on the image plane side (the imaging element 8 side) of the first lens 1 is held by a second lens holding frame 4.

Figure 11:
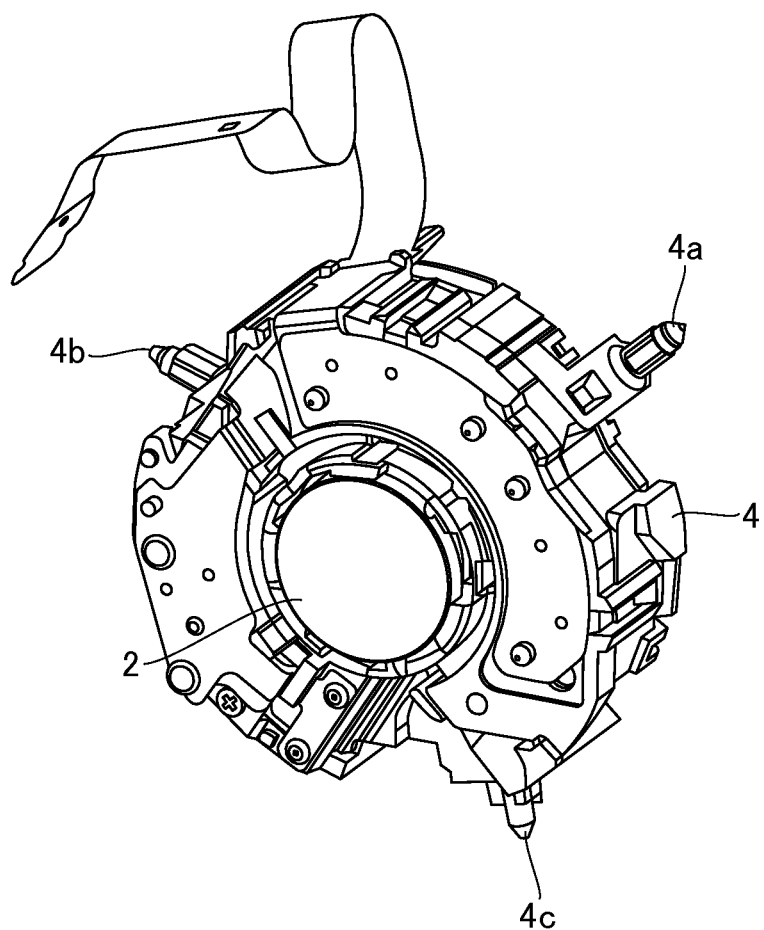
FIG. 11 is a perspective view illustrating a second lens holding frame.
Figure 14:
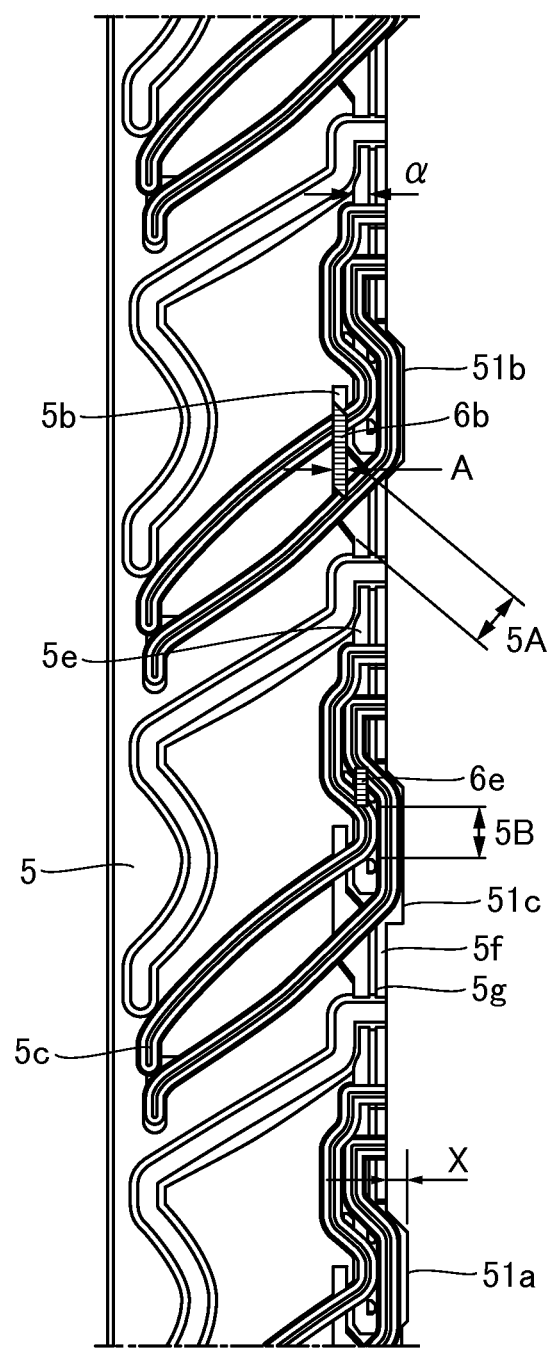
FIG. 14 is a developed view illustrating the inner circumference side of a cam cylinder in the retracted position.

The first lens holding frame 3 and the second lens holding frame 4 have follower pins 4a, 4b, and 4c that follow a cam groove 5c (see FIG. 14), which is a cam portion provided on the inner circumference of the cam cylinder 5, with the follower pins 4a, 4b, and 4c engaging the cam groove 5c (see FIG. 11). The follower pin 4a is expandably formed in a direction perpendicular to the optical axis.

The first lens holding frame 3 and the second lens holding frame 4 arc held so as to be linearly movable in the optical axis direction in a state where the movement of the first lens holding frame 3 and the second lens holding frame 4 in the rotational direction is restricted by a linear cylinder 6 disposed on the inner circumference side of the cam cylinder 5. Specifically, the linear cylinder 6 is a linear restricting member that is operable to move in the optical axis direction with the linear cylinder 6 engaging the cam cylinder 5 and restricts movement of the first lens holding frame 3 and the second lens holding frame 4 in the rotational direction. The first lens holding frame 3 and the second lens holding frame 4 are exemplary lens holding units.

The cam cylinder 5 has a follower pin (follower) 5d (see FIG. 12) that follows a cam groove (not shown) provided on the inner circumference of a fixed cylinder 9. The power is transmitted from a zoom mechanism 30 to a connecting gear 300 so that the cam cylinder 5 moves in the optical axis direction while being rotated.

The cam cylinder 5 includes three projections 51a, 51b, and 51c provided at equi-angular intervals of 120 degrees at its rear end on the imaging element side. Three cam grooves 52a, 52b, and 52c are provided on the inner circumferential surface of the projections 51a, 51b, and 51c, respectively. A projected gear 5j is disposed on the outer circumference side (the outer circumferential surface) of the projection 51a, and the follower pills 4a, 4b, and 4c of the second lens holding frame 4 engage with the cam grooves 52a, 52b, and 52c, respectively, in the WIDE image-taking state (FIG. 7). With this arrangement, the amount of movement of the second lens holding frame 4 can be increased by the thickness X of the projections Ma, Mb, and 51c.

The depth of the cam groove 52a disposed on the inner circumference side of the projection 51a is less than the depth of other cam grooves 52b and 52c in order to maintain the strength of the projected gear 5j. However, since the follower pin 4a is expandably formed, the follower pin 4a can be operated smoothly even if the depth of the cam groove 52a is shallow. The linear cylinder 6 has a linear key 6c that engages with a linear groove (not shown) provided on the inner circumference of the fixed cylinder 9. The linear key 6c is guided by the linear groove so that the linear cylinder 6 linearly moves in the optical axis direction in a state where the rotation of the linear cylinder 6 is restricted.

A third lens holding frame 10 for holding a third lens 7 is disposed between the second lens holding frame 4 and the imaging element 8, and the imaging element 8 is held by an imaging element holding frame 11 secured to the fixed cylinder 9. In the present embodiment, the third lens 7 is a focus lens.

The cam cylinder 5 is rotated by the zoom mechanism 30, so that the cam cylinder 5 extends in the optical axis direction and the first lens holding frame 3 and the second lens holding frame 4 also extend in the optical axis direction. At this time, the linear cylinder 6 is bayonet-coupled with the cam cylinder 5, and is substantially integrated with the cam cylinder 5 so as to linearly move in the optical axis direction.

In the present embodiment, the cam cylinder 5 relatively moves toward and away from the linear cylinder 6 in the optical axis direction by the bayonet coupling structure (to be described below) of the cam cylinder 5 and the linear cylinder 6.

The cam cylinder 5 and the linear cylinder 6 are disposed relatively close to each other in the retracted position (FIG. 6) of the lens barrel 19, and the cam cylinder 5 and the linear cylinder 6 are disposed relatively away from each other in the image-taking position (FIGS. 7 and 8) of the lens barrel 19.

Figure 9:
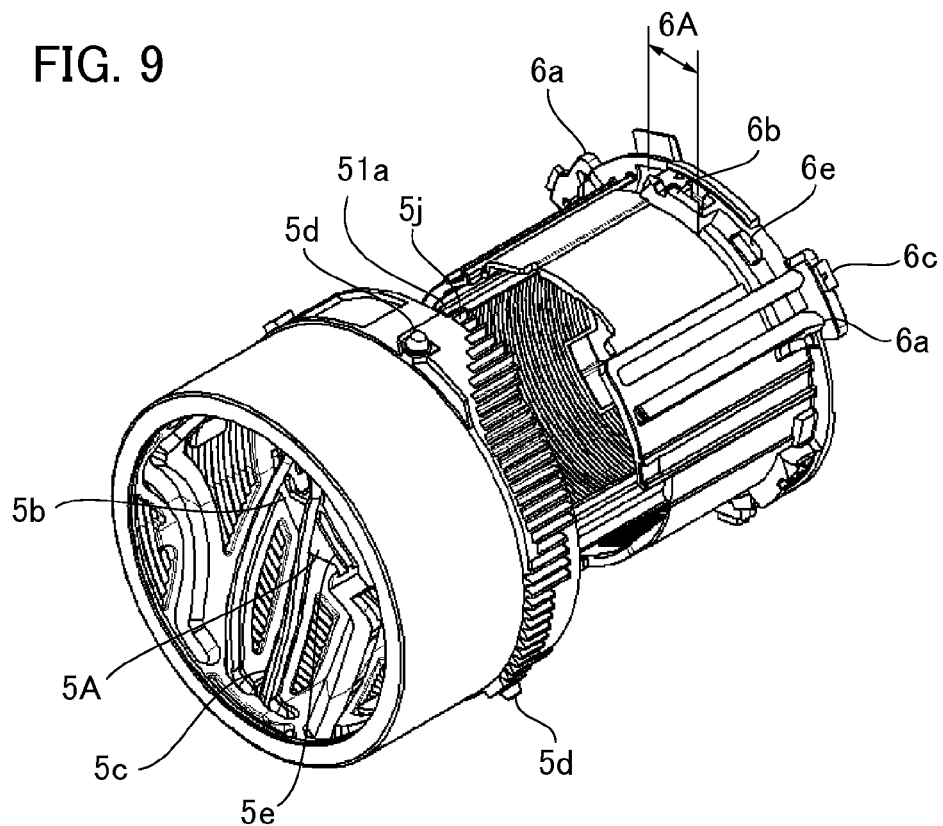
FIG. 9 is an exploded perspective view illustrating a cam cylinder and a linear cylinder.

FIG. 9 is a perspective view illustrating the cam cylinder 5 and the linear cylinder 6. The projected gear 5j is disposed on the imaging element side with respect to the follower pin 5d in the optical axis direction. With this arrangement, the rotation angle of the cam cylinder 5 with respect to the linear cylinder 6 can be increased. Even if the amount of movement of a lens group increases, there is no increase in the drive load for the lens barrel 19. Thus, the necessity of increasing the size of the lens barrel 19 is eliminated.

Figure 10:
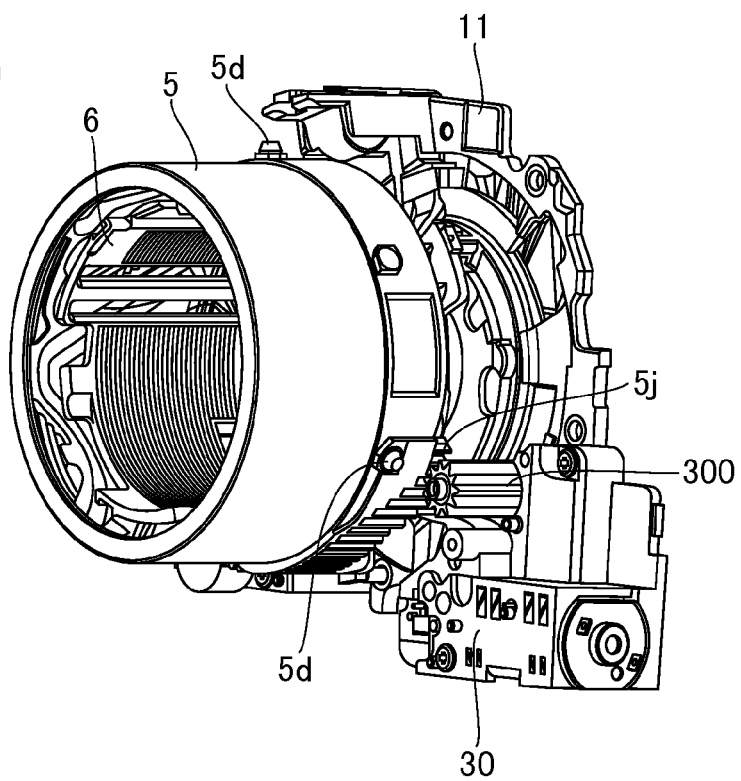
FIG. 10 is a perspective view illustrating a cam cylinder and a connecting gear in the TELE image-taking position.

FIG. 10 illustrates a relationship between the cam cylinder 5 and the connecting gear 300 in the TELE image-taking state of the lens barrel 19. In the TELE image-taking state, the connecting gear 300 meshes only with the projected gear 5j adjacent thereto, so that the total length of the lens barrel 19 can be extended by the thickness X of the projection 51a.

Figure 12A:
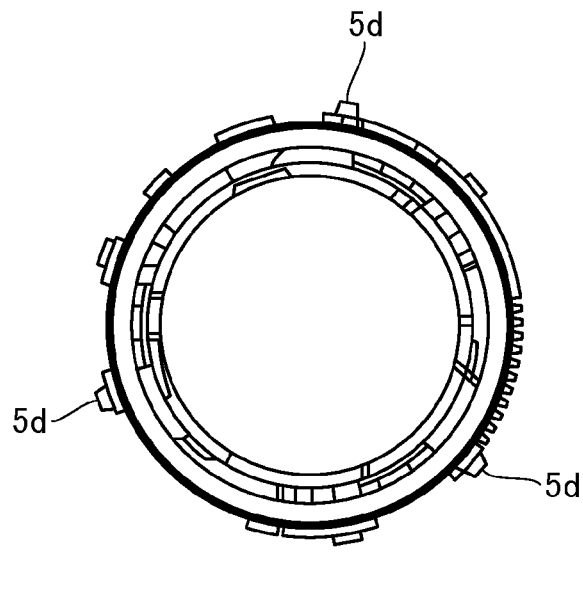
FIGS. 12A and 12B are diagrams illustrating a positional relationship between a cam cylinder and a linear cylinder in a state where a lens barrel is in the retracted position.
Figure 12B:
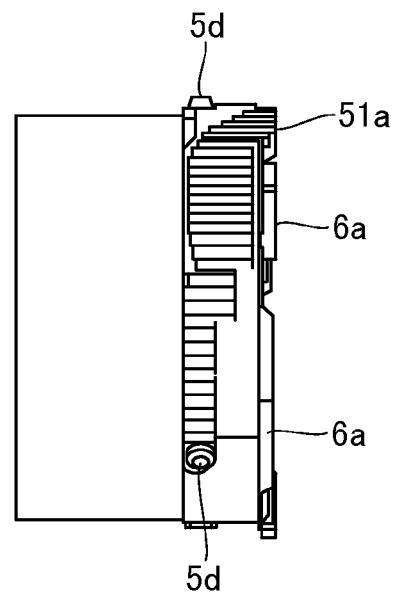

FIGS. 12A and 12B are diagrams illustrating a positional relationship between the cam cylinder 5 and the linear cylinder 6 in a state where the lens barrel 19 is in the retracted position. FIG. 12A illustrates the cam cylinder 5 and the linear cylinder 6 as viewed from the optical axis direction. FIG. 12B is a side view of the cam cylinder 5 and the linear cylinder 6 shown in FIG. 12A.

As shown in FIGS. 12A and 12B, the cam cylinder 5 and the linear cylinder 6 are disposed relatively close to each other in the optical axis direction in the retracted position of the lens barrel 19, and the projection 5a of the cam cylinder 5 and the linear rib 6a of the linear cylinder 6 are disposed so as to be circumferentially opposed to each other. The projection 5a of the cam cylinder 5 is disposed in overlaid relation to the imaging element 8 in the optical axis direction in the retracted state (see FIG. 6). With this arrangement, the length of the lens barrel 19 in the optical axis direction in the retracted position can be reduced, resulting in thinning of the camera.

Figure 13A:
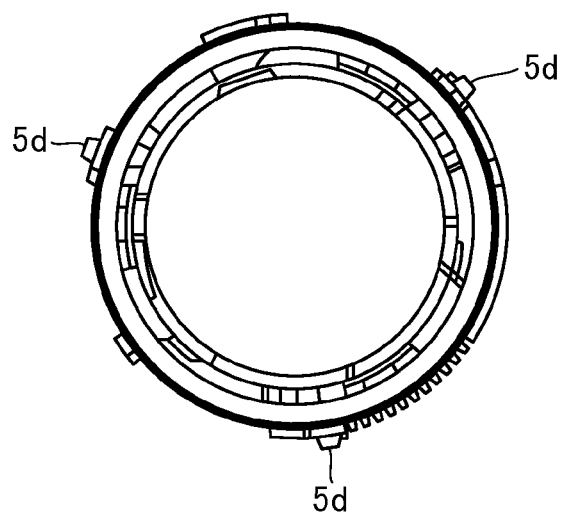
FIGS. 13A and 13B are diagrams illustrating a positional relationship between a cam cylinder and a linear cylinder in a state where a lens barrel is in the image-taking position.
Figure 13B:
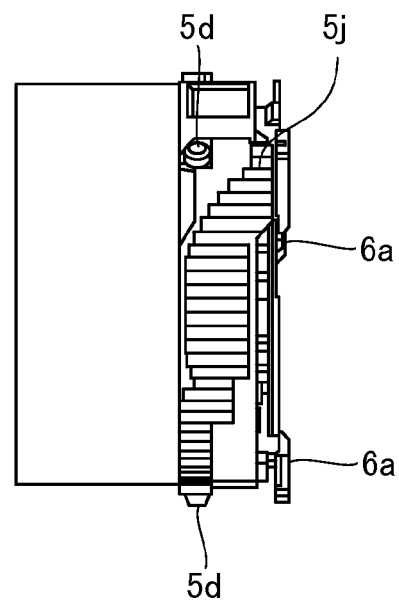

FIG. 13 is a diagram illustrating a positional relationship between the cam cylinder 5 and the linear cylinder 6 in a state where the lens barrel 19 is in the image-taking position. FIG. 13A illustrates the cam cylinder 5 and the linear cylinder 6 as viewed from the optical axis direction. FIG. 13B is a side view of the cam cylinder 5 and the linear cylinder 6 shown in FIG. 13A.

As shown in FIG. 13, the linear rib 6a of the linear cylinder 6 moves toward the imaging element side of the projection 5a of the cam cylinder 5 in the image-taking position of the lens barrel 19. With this arrangement, the linear cylinder 6 relatively moves on the image plane side with respect to the cam cylinder 5 so that the cam cylinder 5 and the linear cylinder 6 are disposed relatively away from each other in the optical axis direction.

Referring back to FIG. 8, first bayonet protrusions 6b are provided on the linear cylinder 6 at plural locations (in the present embodiment, three locations) at substantially equi-intervals in the circumferential direction and helicoid portions 6A are disposed at both sides of the first bayonet protrusion 6b in the circumferential direction. At positions different from the first bayonet protrusions 6b in the image-taking optical axis direction, second bayonet protrusions 6e are also provided on the linear cylinder 6 at plural locations (in the present embodiment, three locations) at substantially equi-intervals in the circumferential direction.

FIGS. 14 to 21 are examples of a developed view illustrating the inner circumference side of the cam cylinder 5 and a developed view illustrating the outer circumference side of the cam cylinder 5. As shown in FIGS. 14 to 21, a circumferential groove 5b which is followed by the first bayonet protrusion 6b upon rotation of the cam cylinder 5 and a circumferential groove 5e which is disposed at a different position from the circumferential groove 5b in the image-taking optical axis direction are formed to extend in the circumferential direction on the inner circumference of the end of the cam cylinder 5 on the image plane side. A circumferential groove 5f which has no side wall on the imaging element side is also disposed at a position different from the circumferential grooves 5b and 5e in the image-taking optical axis direction.

A helicoid groove 5A which is followed by the bayonet protrusion 6b upon rotation of the cam cylinder 5 is formed at a connecting portion between the circumferential grooves 5b and 5e. The helicoid groove 5A has a shape corresponding to the shape of the helicoid portion 6A of the first bayonet protrusion 6b, and diagonally extends in a direction away from the circumferential groove 5b toward the object side. An inlet 5B for inserting the first bayonet protrusion 6b into the circumferential groove 5e is formed at a connecting portion between the circumferential grooves 5e and 5f.

Figure 15:
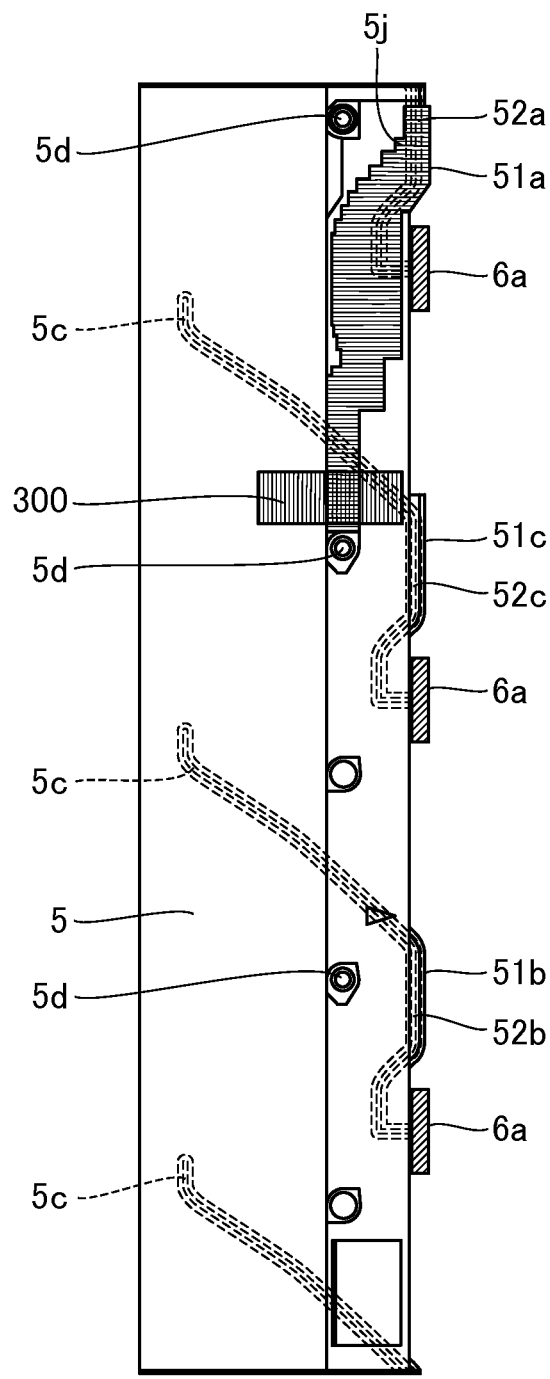
FIG. 15 is a developed view illustrating the outer circumference side of a cam cylinder in the retracted position.

Furthermore, in the present embodiment, the circumferential grooves 5b, 5e, and 5f, the helicoid groove 5A, and the inlet 5B are disposed in three pairs at substantially equi-intervals in the circumferential direction of the inner circumference of the cam cylinder 5. The first bayonet protrusion 6b is disposed on the circumferential groove 5b and the second bayonet protrusion 6e is disposed on the circumferential groove 5e in the retracted position of the lens barrel 19 so that the cam cylinder 5 is bayonet-coupled with the linear cylinder 6 (see FIG. 14). At this time, as described in FIG. 12, the cam cylinder 5 and the linear cylinder 6 are disposed relatively close to each other in the optical axis direction, and the projections 51a, 51b, and 51c of the cam cylinder 5 and the linear rib 6a of the linear cylinder 6 are disposed so as to be circumferentially opposed to each other. Specifically, as shown in FIG. 15, the projections 51a, 51b, and 51c of the cam cylinder 5 and the linear rib 6a of the linear cylinder 6 are disposed in overlapped relation to each other in the optical axis direction.

Figure 16:
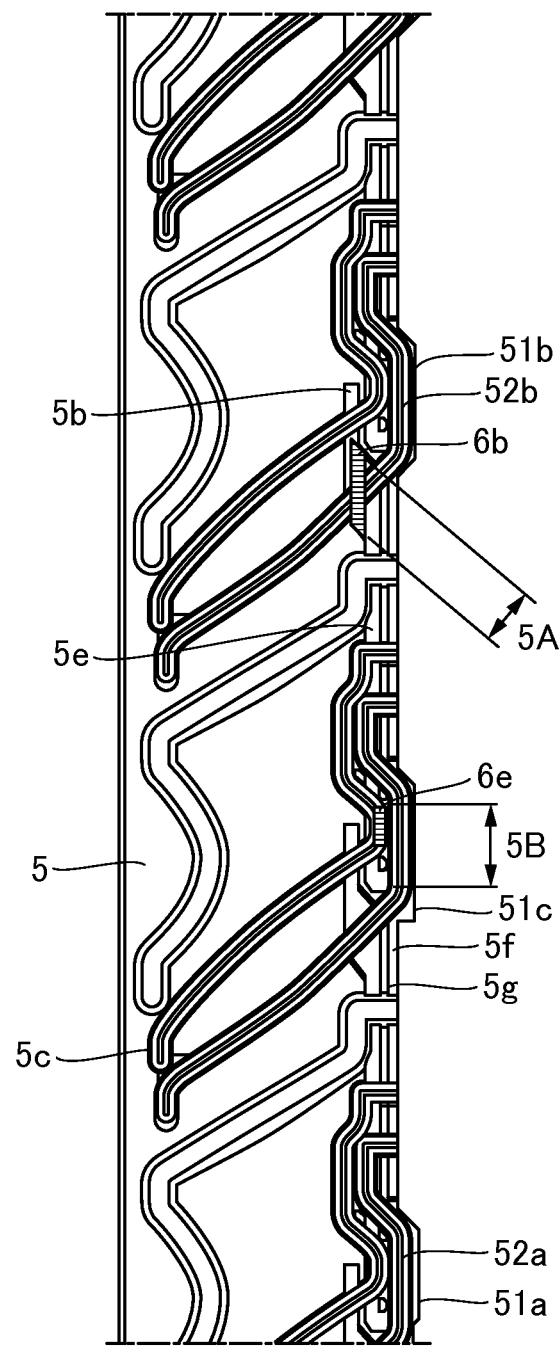
FIG. 16 is a developed view illustrating the inner circumference side of a cam cylinder in an intermediate position between the retracted position and the image-taking position.
Figure 17:
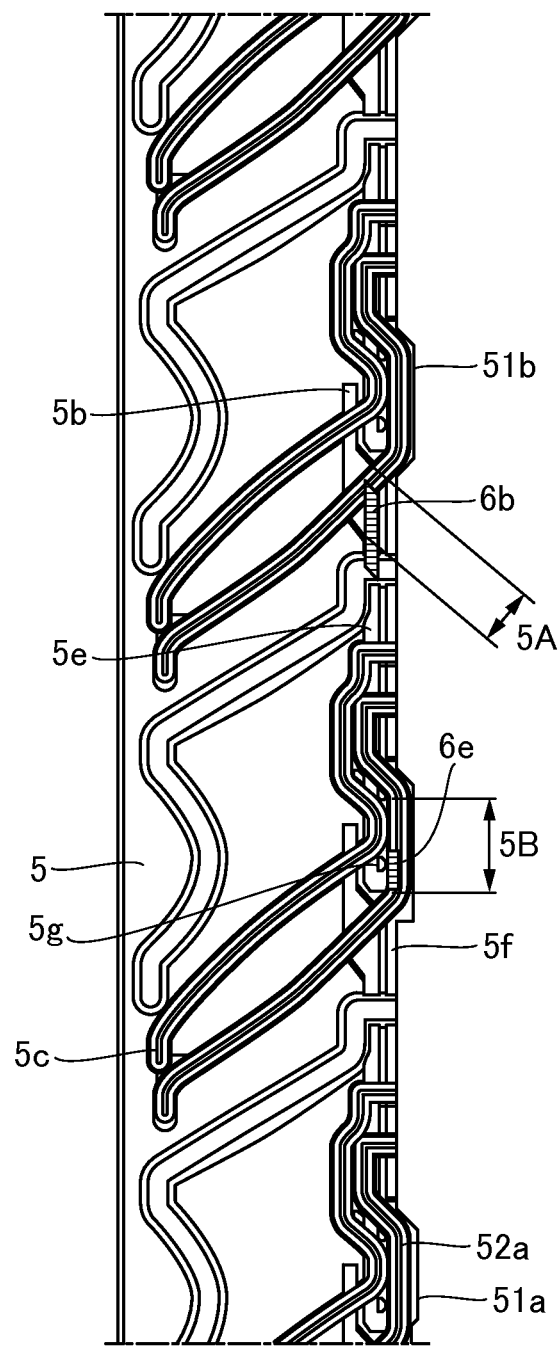
FIG. 17 is a developed view illustrating the inner circumference side of a cam cylinder in the WIDE image-taking position.
Figure 18:
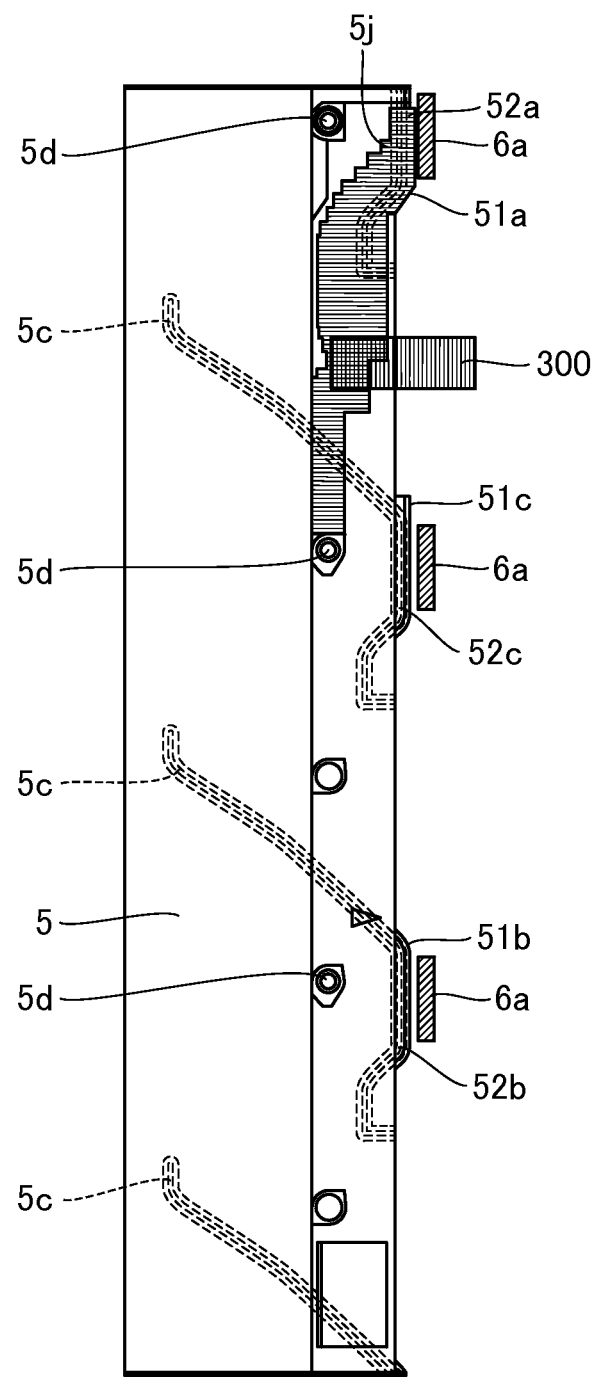
FIG. 18 is a developed view illustrating the outer circumference side of a cam cylinder in the WIDE image-taking position.
Figure 19:
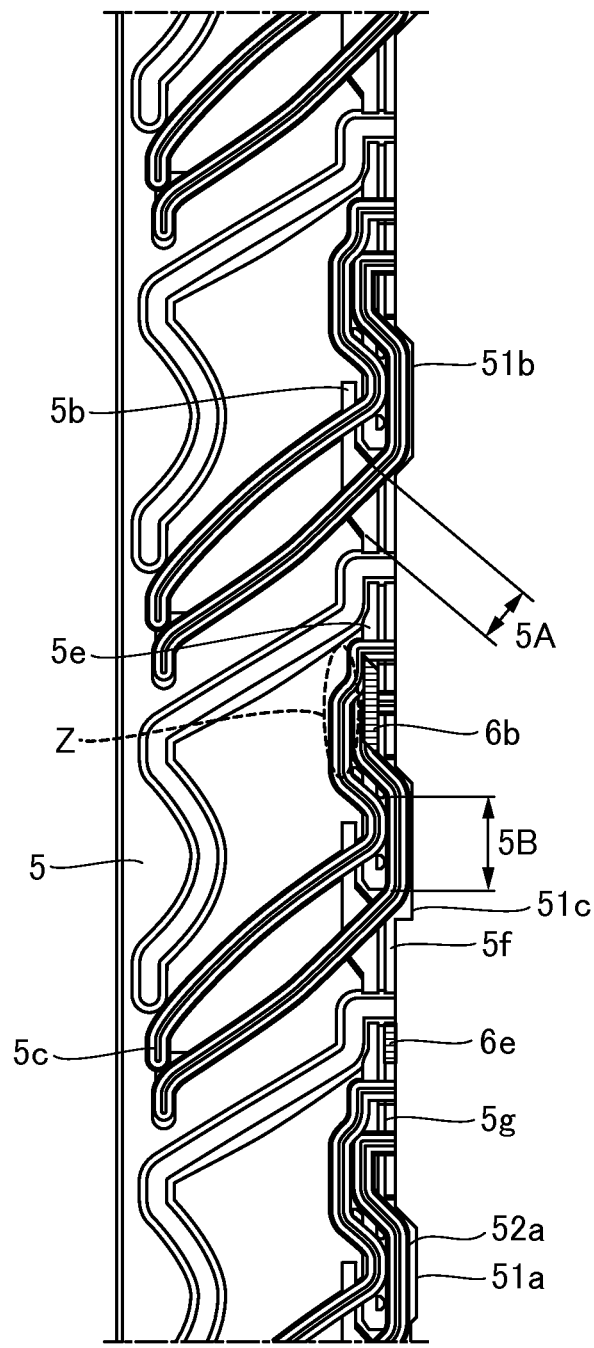
FIG. 19 is a developed view illustrating the inner circumference side of a cam cylinder in an intermediate position between the WIDE image-taking position and the TELE image-taking position.
Figure 20:
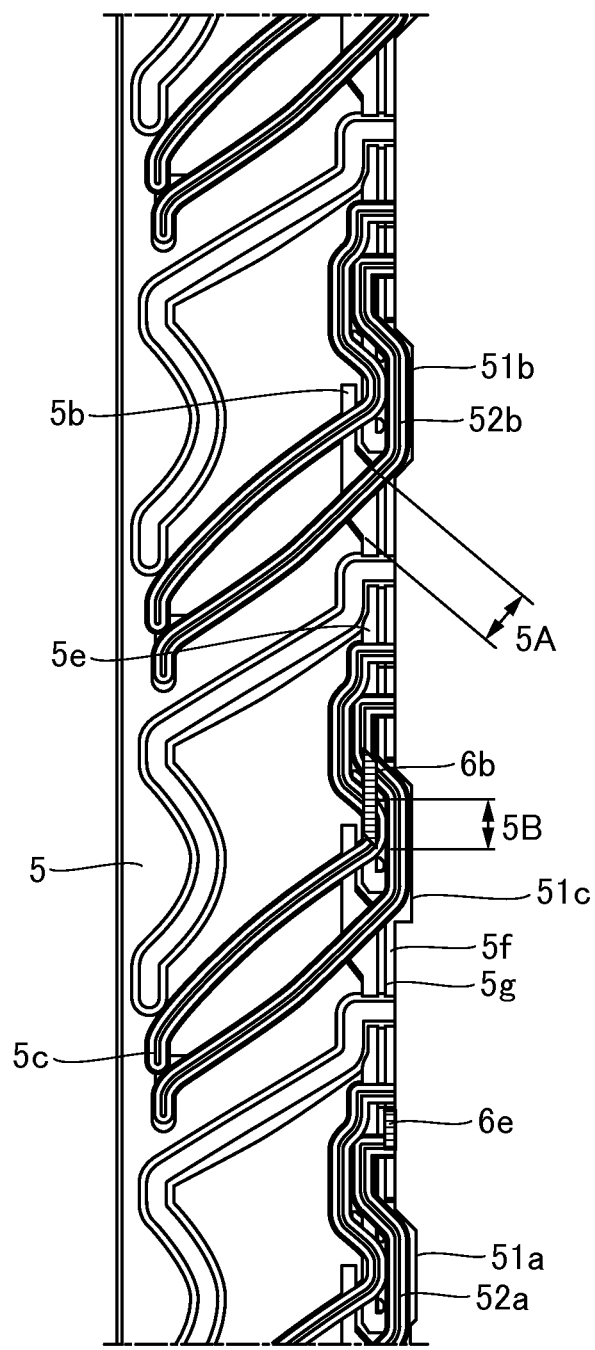
FIG. 20 is a developed view illustrating the inner circumference side of a cam cylinder in the TELE image-taking position.

Next, as the cam cylinder 5 relatively rotates with respect to the linear cylinder 6, the first bayonet protrusion 6b follows along the helicoid groove 5A and then reaches the circumferential groove 5e (see FIG. 16). The second bayonet protrusion 6e extends from the circumferential groove 5e through an inlet groove 5B to thereby reach the circumferential groove 5f (see FIG. 16). At this time, the lens barrel 19 is located in the image-taking position, and the linear cylinder 6 relatively moves toward the image plane side with respect to the cam cylinder 5 so that the cam cylinder 5 and the linear cylinder 6 are disposed relatively away from each other in the optical axis direction as described in FIG. 13. With this arrangement, as shown in FIG. 18, the projections 51a, 51b, and 51c are adapted not to interfere with the linear rib 6a even when the cam cylinder 5 and the linear cylinder 6 rotate relative to each other.

Figure 23A:
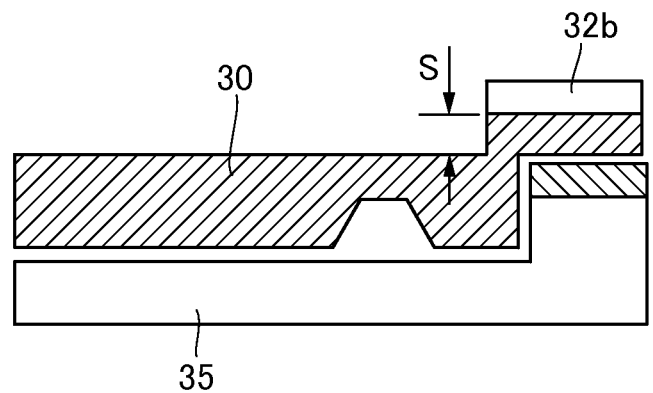
FIG. 23A is a diagram illustrating an exemplary conventional relationship between a cam cylinder and a linear cylinder.
Figure 23B:
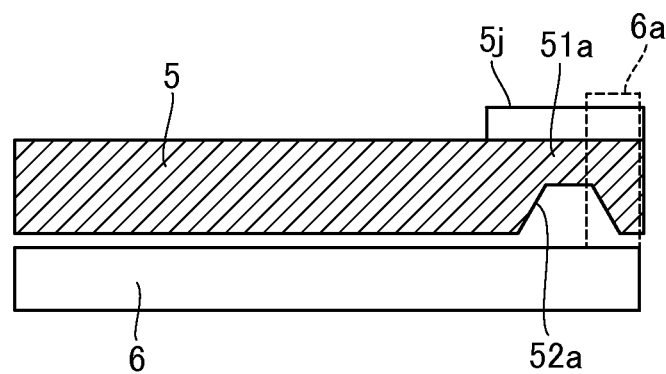
FIG. 23B is a diagram illustrating a retracted position according to one embodiment of the present invention.
Figure 23C:
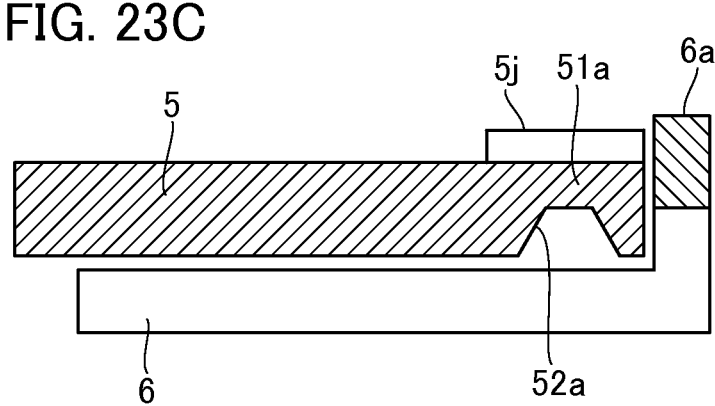
FIG. 23C is a diagram illustrating an image-taking position according to one embodiment of the present invention.

Here, a description will be given of a difference between the lens barrel disclosed in Japanese Patent Laid-Open No. 2006-65138 (FIG. 23A) and the lens barrel of the present embodiment (FIGS. 23B and 23C) with reference to FIG. 23. In the lens barrel shown in FIG. 23A, the flange portion of a guide cylinder 35 that contacts against the linear rib 6a is disposed on the inner circumference side of a rack portion 32b provided in a cam cylinder 30, so that the thickness of the lens barrel increases by S so as to avoid interference. However, in the present embodiment, such necessity is eliminated, resulting in reduction in diameter of the lens barrel (see FIGS. 23B and 23C).

In the present embodiment, the cam grooves 52a, 52b, and 52c of the cam cylinder 5, which are respectively followed by the follower pins 4a, 4b, and 4c of the second lens holding frame 4 in the image-taking position of the lens barrel 19, are provided with an extension toward the inner circumference (rear surface side) of the projections 51a, 51b, and 51c. With this arrangement, the amount of movement of the second lens 2 can be increased by the thickness X of the projections 51a, 51b, and 51c. Consequently, the image-taking magnification of the camera can be increased. Note that the operation of the lens barrel 19 from the image-taking position to the retracted position is vice versa of the above operation.

Here, the bayonet protrusion 6b of the linear cylinder 6 is mated with the circumferential groove 5b of the cam cylinder 5 in the retracted position of the lens barrel 19. Specifically, the bayonet protrusion 6b having a width A is mated with the circumferential groove 5b having a width a shown in FIG. 14 and the bayonet protrusion 6b contacts against the both side wall surfaces of the circumferential groove 5b in the width direction (the optical axis direction), so that the relative position restriction between the cam cylinder 5 and the linear cylinder 6 in the optical axis direction is achieved.

Figure 22A:
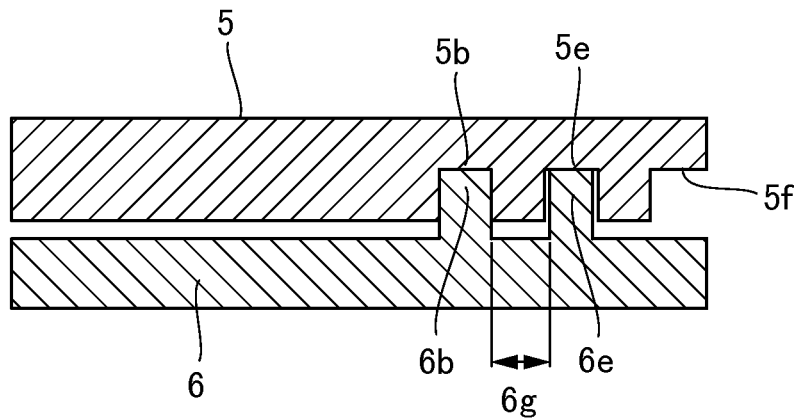
FIG. 22A is a diagram illustrating a state where bayonet protrusions and circumferential grooves are in the retracted position.
Figure 22B:
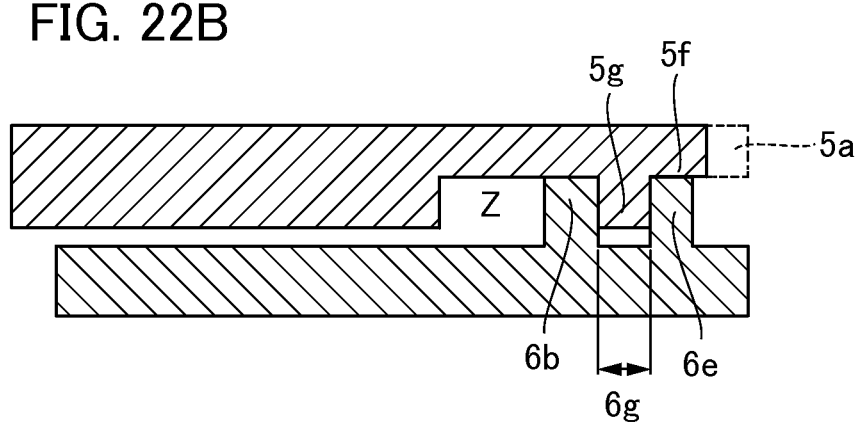
FIG. 22B is a diagram illustrating a second image-taking position.
Figure 22C:
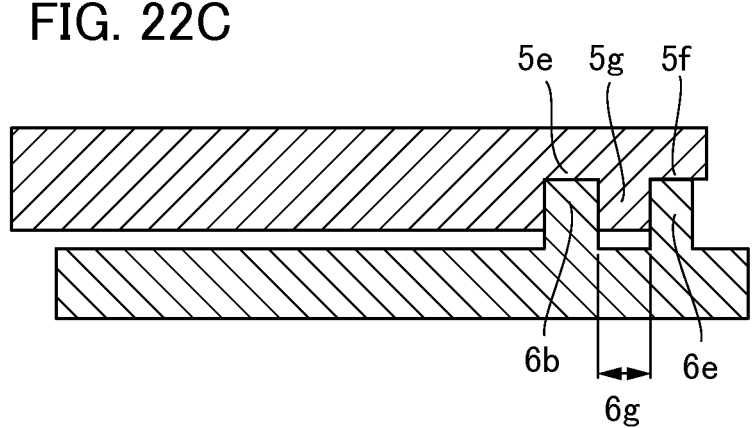
FIG. 22C is a diagram illustrating the first and third image-taking positions.

With reference to FIG. 22A, the bayonet protrusion 6e of the linear cylinder 6 is mated with the circumferential groove 5e of the cam cylinder 5 but does not contact against both side wall surfaces of the circumferential groove 5e in the width direction (the optical axis direction). Then, the first bayonet protrusion 6b of the linear cylinder 6 is mated with the circumferential groove 5e of the cam cylinder 5 in the WIDE image-taking position which is the first image-taking position immediately after the cam cylinder 5 and the linear cylinder 6 are disposed relatively away from each other. A bayonet groove 6g which is formed by a region sandwiched between the first bayonet protrusion 6b and the second bayonet protrusion 6e of the linear cylinder 6 is mated with a circumferential rib portion 5g which is formed by the circumferential grooves 5e and 5f of the cam cylinder 5. With this arrangement, the relative position restriction between the cam cylinder 5 and the linear cylinder 6 in the optical axis direction is achieved in the WIDE image-taking position (see FIGS. 17 and 22C).

An object side wall 5h for the circumferential groove 5e of the cam cylinder 5 is eliminated in the intermediate image-taking position of the lens barrel 19. Thus, the bayonet groove 6g which is formed by a region sandwiched between the first bayonet protrusion 6b and the second bayonet protrusion 6e of the linear cylinder 6 is mated with the circumferential rib portion 5g which is formed by the circumferential grooves 5e and 5f of the cam cylinder 5 (see FIGS. 19 and 22B). With this arrangement, the relative position restriction between the cam cylinder 5 and the linear cylinder 6 in the optical axis direction is achieved in the intermediate image-taking position. As in the WIDE image-taking state, the cam cylinder 5 is mated with the linear cylinder 6 in the TELE image-taking position of the lens barrel 19 (see FIGS. 20 and 22C). In this manner, the mated state in the WIDE image-taking position and the mated state in the intermediate image-taking position are repeated.

Figure 21:
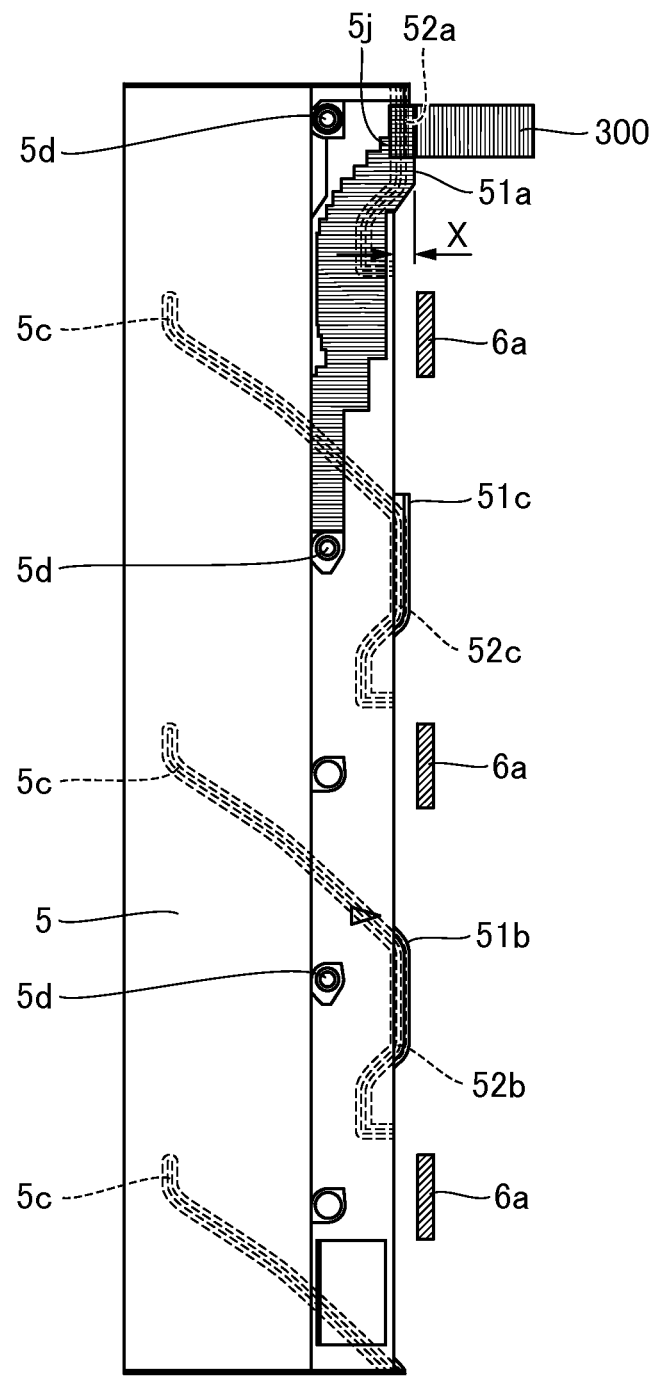
FIG. 21 is a developed view illustrating the outer circumference side of a cam cylinder in the TELE image-taking position.

As described above, in the present embodiment, the side wall surface on the object side can be opened at least by the circumferential groove 5f in the image-taking position of the lens barrel 19, and a cam groove or the like can be disposed on the region indicated by the symbol Z shown in FIG. 16B. As shown in FIG. 21, the connecting gear 300 meshes only with the projected gear 5j, so that the total length of the lens barrel 19 can be extended by the thickness X of the projection 51a. Consequently, an increase in the total length of the lens barrel 19 in the image-taking state and thinning of the camera in the retracted state can be achieved at the same time without increasing the outer diameter of the lens barrel 19.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-164756, filed on Aug. 8, 2013, which is hereby incorporated by reference herein in its entirety.

What is claimed is:

1. A lens barrel comprising:
   a lens holding unit configured to hold a lens; and
   a cam cylinder comprising, on an inner circumference of the cam cylinder, a cam groove for engaging with the lens holding unit, wherein rotation of the cam groove causes the lens holding unit to move in an optical axis direction,
   wherein a projection is provided at the end of the cam cylinder on an imaging side,
   wherein a first gear for transmitting a power for rotating the cam cylinder is provided on an outer circumferential surface of the projection, and
   wherein the cam groove is provided on an inner circumferential surface of the projection.

2. The lens barrel according to claim 1, wherein the first gear is mated with a second gear which is adjacent to the cam cylinder and which is connected to a driving unit serving as a power source for rotating the cam cylinder at an image-taking position.

3. The lens barrel according to claim 1, further comprising:
   a linear cylinder that is disposed on the inner circumference side of the cam cylinder and that restricts movement of the lens holding unit in the rotational direction while moving in the optical axis direction engaging with the cam cylinder.

4. The lens barrel according to claim 1, further comprising:
   a fixed barrel that is disposed on an outer circumference side of the cam cylinder and that has a groove on the inner circumference thereof; and
   a follower that is provided on the outer circumferential surface of the cam cylinder so as to follow the groove,
   wherein the first gear is disposed closer to the image side than the follower.

5. An imaging apparatus comprising:
the lens barrel according to claim 1.

6. A lens barrel comprising:
a lens holding unit configured to hold a lens; and
a cam cylinder comprising, on an inner circumference of the cam cylinder, a first cam groove for engaging with the lens holding unit, wherein rotation of the first cam groove causes the lens holding unit to move in an optical axis direction,
wherein a first projection is provided at the end of the cam cylinder on an imaging side,
wherein a first gear for transmitting a power for rotating the cam cylinder is provided on an outer circumferential surface of the first projection,
wherein the first cam groove is provided on an inner circumferential surface of the first projection,
wherein the lens holding unit is provided with a cam pin,
wherein the cam pin follows the first cam groove engaging with the first cam groove,
wherein the cam cylinder is provided with a second projection, upon which the first gear is not provided, which second projection is provided with a second cam groove,
wherein a depth of the first cam groove is less than that of the second cam groove, and
wherein the cam pin is expandably formed.

* * * * *